H. K. SANDELL.
RECTIFIER.
APPLICATION FILED MAY 1, 1914.
1,208,385.
Patented Dec. 12, 1916.
3 SHEETS—SHEET 1.
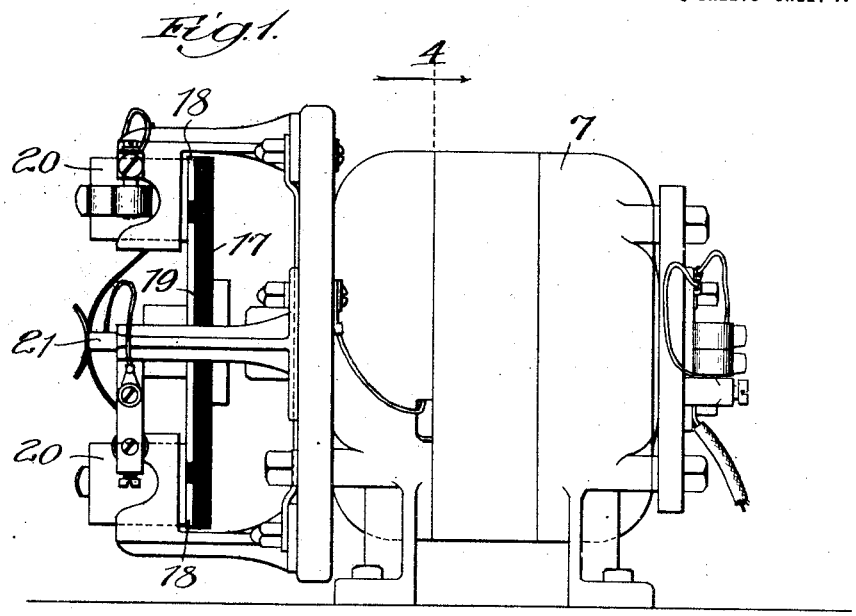
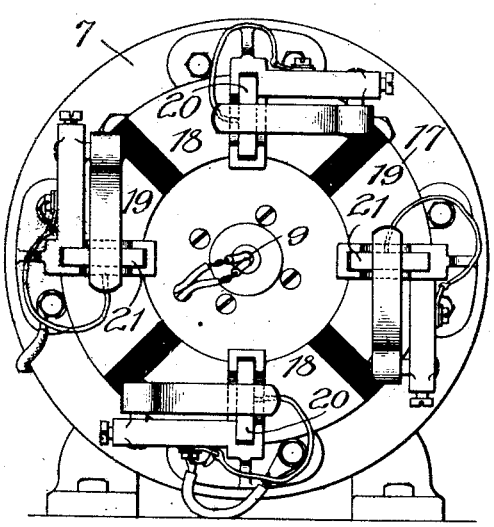
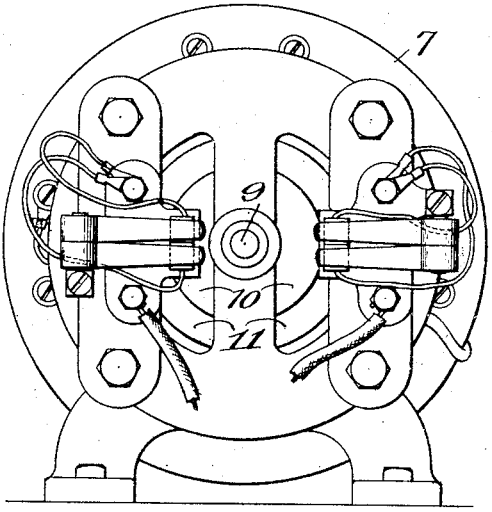
Witnesses:
Inventor:
Henry K. Sandell,

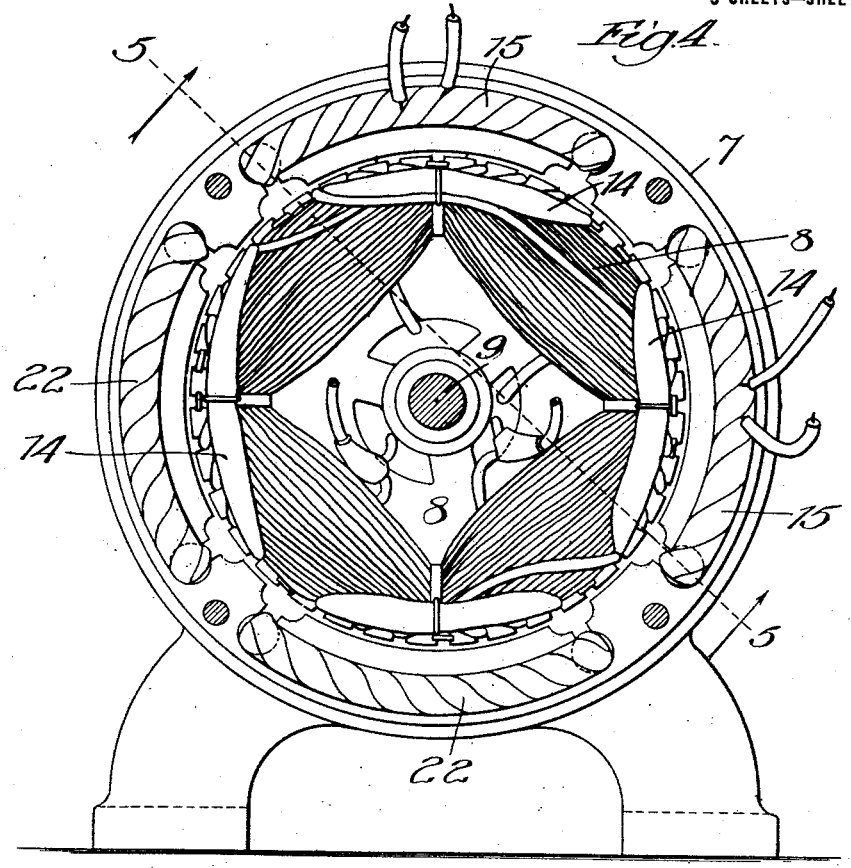
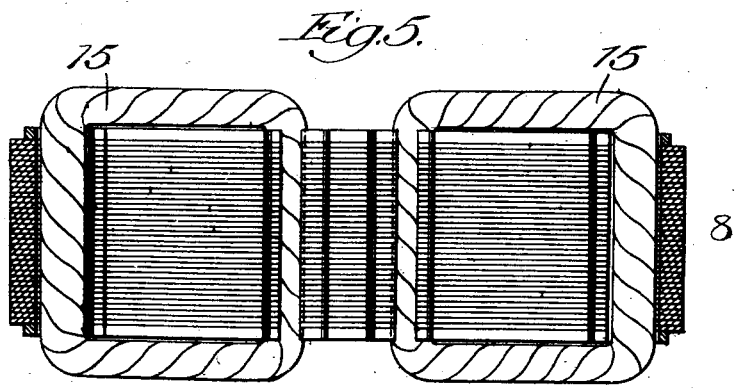

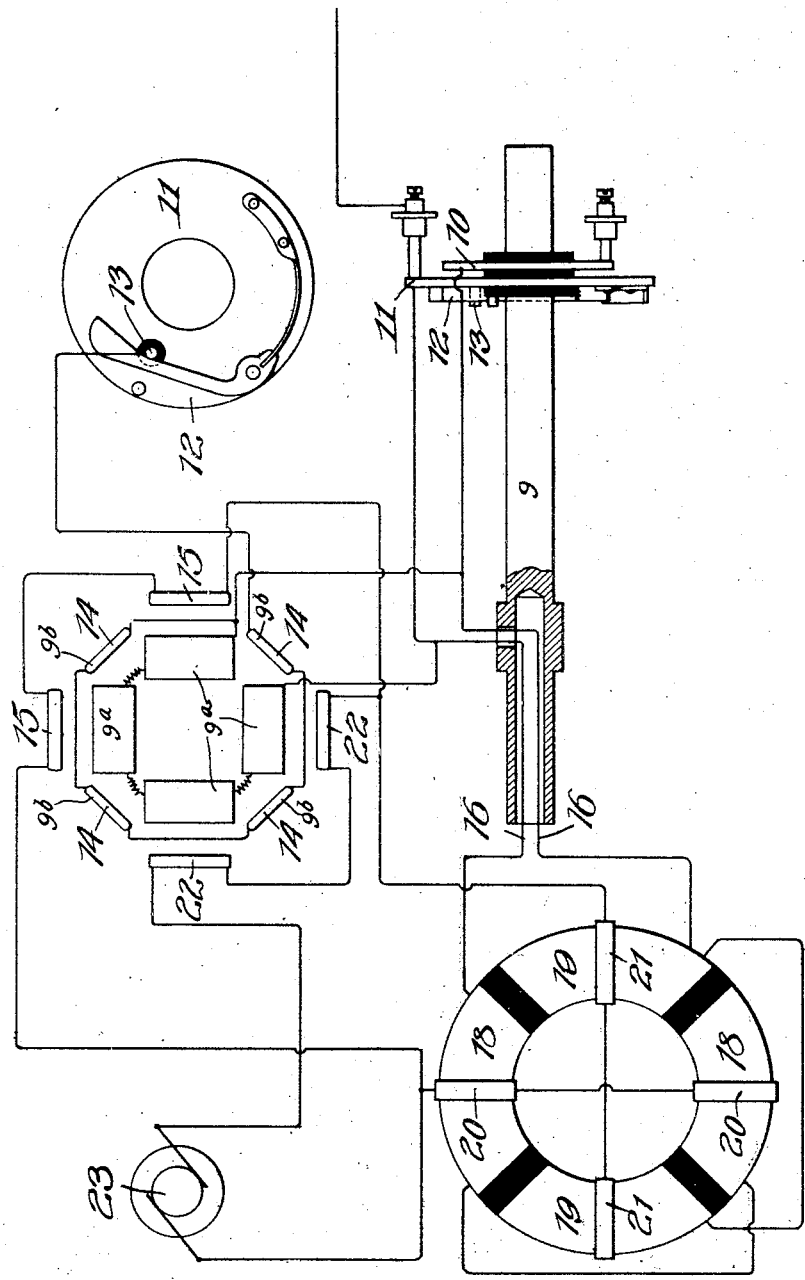

UNITED STATES PATENT OFFICE.

HENRY K. SANDELL, OF CHICAGO, ILLINOIS, ASSIGNOR TO HERBERT S. MILLS, OF CHICAGO, ILLINOIS.

RECTIFIER.

1,208,385.

Specification of Letters Patent.

Patented Dec. 12, 1916.

Application filed May 1, 1914. Serial No. 835,643.

*To all whom it may concern:*

Be it known that I, HENRY K. SANDELL, a citizen of the United States, residing at Chicago, in the county of Cook and State of Illinois, have invented a new and useful Improvement in Rectifiers, of which the following is a specification.

My invention relates to certain new and useful improvements in rectifiers and is fully described and explained in the specification and shown in the accompanying drawings, in which:

Figure 1 is a side elevation of my improved device; Fig. 2 is an end view from the left of Fig. 1; Fig. 3 is an end view looking in the opposite direction showing the alternating-current brushes; Fig. 4 is a section on the line 4 of Fig. 1; Fig. 5 is a section through the stator on line 5 of Fig. 4, and Fig. 6 is a circuit diagram.

Referring to the drawings, 7 generally indicates the stator which may be of known type and is here shown of the ordinary induction motor type. Mounted within the stator is the rotor 8 carried by a shaft 9. The rotor is provided with the usual pole-pieces of radial form, main coils 9$^a$, starting coils 9$^b$, and with the slip-rings 10 and 11 through which the current can be led in from the brushes. A centrifugal device for cutting out the starting coils is shown diagrammatically in Fig. 6 and this is, or may be of any desired construction. In the form shown, it consists of a conducting piece 12 having electrical connection with the slip-ring 11 and contacting with a pin 13 electrically connected with the starting coils which are shown at 14. When the rotor is moving at the desired speed, the piece 12 moves away from the pin 13, cutting out the starting coils.

The parts thus far shown and described, it will be seen, are those of the common induction motor in which the current is led to the rotor through slip-rings, and the stator is of a type common in such motors and carries the induced currents. This type of motor is highly advantageous for use in a rectifier of small size because it is very cheap and is thoroughly practical for small-sized devices. In using the device, however, for rectifying purposes, it must be got into step and remain in step and, therefore, in some manner it becomes necessary to eliminate the slip which is the characteristic of induction motors. In other words, the induction motor must be made to run synchronously. This is accomplished by inserting into the field or stator two coils 15 in series with each other and so wound as to produce localized fields of opposite polarity, which coils 15 are excited by the rectified current produced as hereinafter specified, being in parallel with the main leads therefrom. These coils are supplemented in the manner and for the purpose hereinafter explained.

The shaft at the left of the rotor is hollowed out to receive conductors 16 which carry the unrectified current. On the end of the shaft is a disk 17 carrying four commutator segments 18 and 19, the correspondingly numbered segments being electrically connected together, while the two conductors 16 are respectively connected to the two pairs of commutator segments, so that each has connection with two opposite segments. Bearing upon the commutator segments are four brushes 20 and 21, 90° apart, the opposite and correspondingly numbered brushes being electrically connected. This construction is such that the rectified current flowing in one direction is divided between the two commutator segments and brushes of each pair whereby the effective surface is made large.

For the purpose of supplementing the action of the synchronizing coils 15 heretofore described, and particularly for the purpose of assuring synchrony with low voltage currents, I provide two additional coils 22 in the stator, similar in construction and position to the coils 15 but wound with relatively heavy wire and placed in series with the leads which carry away the rectified currents from the brushes. Reference to Fig. 6 will show that one of the brushes 20 is connected to one of the line wires which is shown as supplying current to a translator, such as the motor 23, while one of the brushes 21 leads through the stator coils 22 and thence to the opposite line wire leading to the translator.

It is believed that the operation of the device will be readily apparent from the description of its construction. The alternating current is led in through the brushes on the slip-rings 10 and 11, energizing the main and starting coils of the rotor. When the rotor is up to speed, which is nearly a synchronous speed, the slip being naturally very small, the current led out of the brushes bearing on the commutator segments will alternate only very slowly. It will obviously alternate only as often as the slip amounts to a quarter turn of the rotor. During any one of the periods of flow of the current thus issuing from the commutator brushes, the coils 15 and 22 in the stator can become energized and establish localized poles in the stator, so that thereafter the rotor will run synchronously and the direct current can be continuously drawn from the commutator brushes and utilized in any desired manner as, for instance, in the motor which is shown diagrammatically in Fig. 6 as having connection therewith. Of course, as soon as the rotor is moving at a sufficiently high speed, its starting coils are cut out in the usual manner.

The mechanical structure here shown is very simple and is peculiarly designed for rectifying currents of relatively small volume. The motor is, or may be, of a type commonly sold on the market at a very low price, varied only by the introduction of the coils into its stator. It requires no modification except the addition of these coils and the provision of the commutator at one end. By permitting current to flow direct from the slip-rings to the commutator-segments instead of through the armature, a considerably greater volume of current can be rectified than could be safely passed through the armature. In the motor selected the rotor is the part affected by the alternating current because, by such construction, the necessary number of movable parts is reduced to the minimum.

I realize that considerable variation is possible in the details of the construction herein shown, and I do not intend to limit myself thereto, except as pointed out in the following claims, in which it is my intention to claim all the novelty inherent in the device as broadly as is permitted by the state of the art.

I claim as new and desire to secure by Letters Patent:

1. In combination with a stator of the induction type and two field windings therein, for the purpose set forth, a rotor, coils thereon, slip-rings carried by the rotor and having connection with its coil, a commutator carried by the rotor, connections from the slip-rings to the commutator segments, line wires having connection with the commutator brushes, one of the stator field windings being in parallel with the line wires and the other in series therewith.

2. A device of the character described, comprising a magnetizable rotor, coils thereon, slip-rings to receive alternating current, connections between the slip-rings and the rotor coil, an inductive stator surrounding the rotor, a commutator carried by the rotor, connections between the slip-rings and commutator segments, brushes bearing on the commutator segments, two windings in the stator, direct current leads from the commutator brushes and connections with the two stator windings, one being in parallel with the direct current leads and the other in series therewith.

3. A device of the character described, comprising a magnetizable rotor, coils thereon, slip-rings to receive alternating current, a commutator carried by the rotor, brushes bearing on the commutator to lead off the rectified current, a connection between the slip-rings and rotor coils, a connection in parallel with the rotor coils leading to the commutator segments; two coils in the stator, direct current leads from the commutator brushes and connections to the two stator coils, one of said coils being parallel to the other in series with the direct current leads.

4. A device of the character described, comprising a primary member receiving alternating current and a secondary member, one of said members being a rotor and the other a stator, three windings in the secondary member, one of the windings being short circuited on itself and the other two being in the form of coils, a commutator, connections for leading alternating current to the primary member and to one of the commutator members in parallel with the coils of the primary member, direct current leads from the other commutator member, supplying direct current to the two coils in the secondary member, one of said coils being in parallel, the other in series with the load supplied with direct current by the commutator.

In testimony whereof I have hereunto set my hand this 22nd day of April, 1914.

HENRY K. SANDELL.

In presence of two subscribing witnesses:
F. A. FLORELL,
NELLIE B. DEARBORN.